(12) United States Patent
Okada et al.

(10) Patent No.: US 9,362,849 B2
(45) Date of Patent: Jun. 7, 2016

(54) ELECTROSTATIC INDUCTION POWER GENERATOR

(75) Inventors: Wataru Okada, Kusatsu (JP); Kenji Sakurai, Kizugawa (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 658 days.

(21) Appl. No.: 13/512,607

(22) PCT Filed: Dec. 10, 2010

(86) PCT No.: PCT/JP2010/072220
§ 371 (c)(1),
(2), (4) Date: Aug. 6, 2012

(87) PCT Pub. No.: WO2011/083658
PCT Pub. Date: Jul. 14, 2011

(65) Prior Publication Data
US 2013/0134828 A1    May 30, 2013

(30) Foreign Application Priority Data
Jan. 8, 2010    (JP) .................................. 2010-002471

(51) Int. Cl.
| H02N 11/00 | (2006.01) |
| H02N 1/00 | (2006.01) |
| H02N 2/00 | (2006.01) |
| H02N 1/08 | (2006.01) |

(52) U.S. Cl.
CPC ....................................... *H02N 1/08* (2013.01)

(58) Field of Classification Search
CPC .................... H02N 1/00; H02N 1/08
USPC .......... 310/300, 309, 313 A, 323.02, 323.06, 310/327, 342
See application file for complete search history.

(56) References Cited

U.S. PATENT DOCUMENTS

| 3,094,653 A * | 6/1963 | Le May ................... H02N 1/06 |
| | | 310/309 |
| 3,846,780 A * | 11/1974 | Gilcher .................. G08B 13/26 |
| | | 340/562 |
| 2008/0122313 A1* | 5/2008 | Mabuchi et al. .............. 310/309 |
| 2009/0079295 A1 | 3/2009 | Naruse et al. |

FOREIGN PATENT DOCUMENTS

| CN | 101197548 A | 6/2008 |
| JP | 62-44079 A | 2/1987 |

(Continued)

OTHER PUBLICATIONS

Machine Translation JP07067360 (1995).*
International Search Report w/translation from PCT/JP2010/072220 dated Mar. 8, 2011 (6 pages).
Patent Abstracts of Japan Publication No. 02-219478 dated Sep. 3, 1990 (1 page).

(Continued)

*Primary Examiner* — Jose Gonzalez Quinone
(74) *Attorney, Agent, or Firm* — Osha Liang LLP

(57) ABSTRACT

An electrostatic induction power generator includes a first base body and a second base body, which are configured to be able to reciprocate relative to each other and between which an annular clearance is formed. The electrostatic induction power generator further includes an electret provided on the first base body, and a first electrode and a second electrode provided on the second base body. The electret is formed by coating a charged dielectric material on a surface of a linear conducting wire and both of the first electrode and the second electrode are formed of a linear conducting wire.

13 Claims, 8 Drawing Sheets

(56) References Cited

FOREIGN PATENT DOCUMENTS

| JP | 2-219478 A | | 9/1990 |
|---|---|---|---|
| JP | 04222471 A | * | 8/1992 |
| JP | 7-067360 A | | 3/1995 |
| JP | 7-79026 A | | 3/1995 |
| JP | 07067360 A | * | 3/1995 |
| JP | 07079026 A | * | 3/1995 |
| JP | 2005-110494 A | | 4/2005 |
| JP | 2006-180450 A | | 7/2006 |
| JP | 2008-86190 A | | 4/2008 |
| JP | 2008-161040 A | | 7/2008 |
| JP | 2009-81950 A | | 4/2009 |
| JP | 2010092317 A | * | 4/2010 |

OTHER PUBLICATIONS

Patent Abstracts of Japan Publication No. 62-044079 dated Feb. 26, 1987 (1 page).
espacenet Abstract Publication No. JP2005110494A dated Apr. 21, 2005 (1 page).
espacenet Abstract Publication No. JP7079026A dated Mar. 20, 1995 (1 page).
Office Action issued in Chinese Application No. 201080054246.7, mailed on Apr. 3, 2014 (15 pages).
International Preliminary Report on Patentability and Written Opinion from PCT/JP2010/072220 mailed on Aug. 16, 2012 (7 pages).
Extended European Search Report in a counterpart European Application No. 10 842 171.0 issued Jul. 6, 2015 (4 pages).

* cited by examiner

ELECTROSTATIC INDUCTION POWER GENERATOR

TECHNICAL FIELD

The present invention relates to an electrostatic induction power generator that can be used as a vibration power generator or the like for generating power using ambient vibration.

BACKGROUND ART

Conventionally, an electrostatic induction power generator is known in which a pair of substrates configured to be able to reciprocate relative to each other while maintaining a state in which the substrates face each other are provided, a plurality of electrets are arranged in a row on one of the pair of substrates, and a plurality of pairs of electrodes are arranged in a row on the other one of the pair of substrates. According to the electrostatic induction power generator, when the pair of substrates move relative to each other, an electrostatic capacitance between one electrode of a pair of electrodes and the electret changes and also an electrostatic capacitance between the other electrode of a pair of electrodes and the electret changes, so that a difference of the electrostatic capacitances is output as electric power.

When manufacturing the electrostatic induction power generator, semiconductor microfabrication techniques are conventionally used to form fine electrodes (electrets and electrodes for collecting electric power) on the substrates. However, the semiconductor microfabrication techniques generally require large-scale equipment, and further when producing the electrostatic induction power generators using the semiconductor microfabrication techniques, the number of electrostatic induction power generators that can be produced per unit time is small and the processing cost is extremely high.

Patent Literature 1: Japanese Patent Application Laid-Open No. 2006-180450

SUMMARY OF INVENTION

One or more embodiments of the present invention provide an electrostatic induction power generator that can reduce processing cost.

One or more embodiments of the present invention employ involve the means described below.

In accordance with one or more embodiments, an electrostatic induction power generator of the present invention includes a first base body and a second base body which are configured to be able to reciprocate relative to each other and between which an annular clearance is formed, an electret provided on the first base body, and a first electrode and a second electrode provided on the second base body.

Electric power is output when a positional relationship between the electret and the first electrode changes and a positional relationship between the electret and the second electrode changes following a change of relative positions of the first base body and the second base body and thereby an electrostatic capacitance between the electret and the first electrode changes and an electrostatic capacitance between the electret and the second electrode changes.

The electret is formed by coating a charged dielectric material on a surface of a linear conducting wire (in the present invention, "linear" means a long and narrow object including a wiry object having a circular cross section and a belt-shaped object having a rectangular cross section and the shape of the cross section is not limited), and both of the first electrode and the second electrode are formed of a linear conducting wire.

In the present embodiments, the electret is formed by coating a charged dielectric material on a surface of a linear conducting wire and both of the first electrode and the second electrode are formed of a linear conducting wire. Therefore, the first electrode, the second electrode, and the electret can be manufactured without using semiconductor microfabrication techniques.

The electret may be provided on the first base body over the entire circumference of the first base body along the circumferential direction and the first electrode and the second electrode may be provided on the second base body over the entire circumference of the second base body along the circumferential direction.

An electrostatic attractive force is generated between the electret and the first electrode and between the electret and the second electrode. The electrostatic attractive force can be a force that prevents the relative reciprocal movement of the first base body and the second base body. Specifically, as in a normal electrostatic induction power generator, when the electret is provided on one of a pair of plate substrates and the first electrode and the second electrode are provided on the other substrate, a force in a direction in which the substrates approach each other is applied by the electrostatic attractive force. Therefore, the electrostatic attractive force prevents the relative reciprocal movement of the pair of substrates. On the other hand, if the configuration of the present invention is employed, the electrostatic attractive forces are generated over the entire circumferences of the annular clearance, so that, with respect to an electrostatic attractive force generated at one position, an electrostatic attractive force is also generated at a position shifted from the one position by 180°. Therefore, both electrostatic attractive forces applied to the first base body and the second base body are offset or reduced by the electrostatic attractive force generated at one position and the electrostatic attractive force generated at a position shifted from the one position by 180°. Thus, it is possible to reduce the effects of the electrostatic attractive forces affecting the relative reciprocal movement of the first base body and the second base body.

The first base body and the second base body may be configured to be able to reciprocate relative to each other while the annular clearance formed between the first base body and the second base body maintains a constant clearance over the entire circumferences and the annular clearance may be formed so that the clearance is substantially the same over the entire circumferences.

Thereby, it is possible to stably obtain electric power over the entire circumferences. Further, the electrostatic attractive forces generated between the electret and the first electrode and between the electret and the second electrode are substantially the same over the entire circumferences, so that it is possible to efficiently reduce the effects of the electrostatic attractive forces affecting the relative reciprocal movement of the first base body and the second base body.

One of the first base body and the second base body may be formed of a cylindrical member and the other one may be formed of a circular column shaped member or a cylindrical member provided so that a central axis thereof corresponds to a central axis of the cylindrical member inside a cylinder of the cylindrical member.

Thereby, the clearance of the annular clearance can be the same over the entire circumferences.

The first base body may be provided with a guard electrode formed of a linear conducting wire, which is provided at a position that faces one of the first electrode and the second electrode when the electret faces the other one of the first electrode and the second electrode.

The guard electrode is provided in this way, so that it is possible to stabilize the output voltage.

An insulating layer may be provided on surfaces of the conducting wires of the first electrode and the second electrode.

Thereby, it is possible to prevent electrical discharge from the electret.

The configurations described above can be employed by combining the configurations as much as possible.

As described above, according to one or more embodiments of the present invention, the processing cost can be reduced.

DESCRIPTION OF EMBODIMENTS

Hereinafter, aspects for implementing the present invention will be exemplarily described in detail on the basis of embodiments. Note that the size, material, shape, and relative position of components described in the embodiments do not limit the scope of the present invention unless otherwise particularly mentioned.

(Embodiment 1)

An electrostatic induction power generator according to Embodiment 1 of the present invention will be described with reference to FIGS. 1 to 6.

<Overall Configuration of Electrostatic Induction Power Generator>

Figure 1:
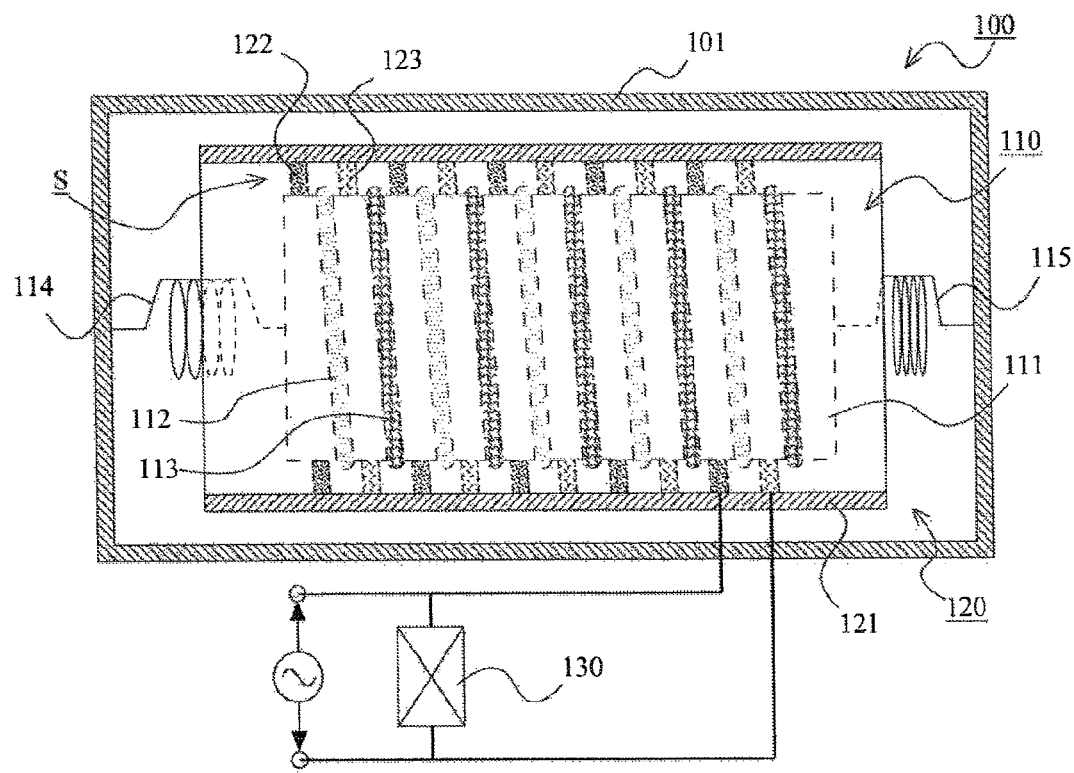
FIG. 1 is a schematic configuration diagram showing an overall configuration of an electrostatic induction power generator according to Embodiment 1 of the present invention.
Figure 2:
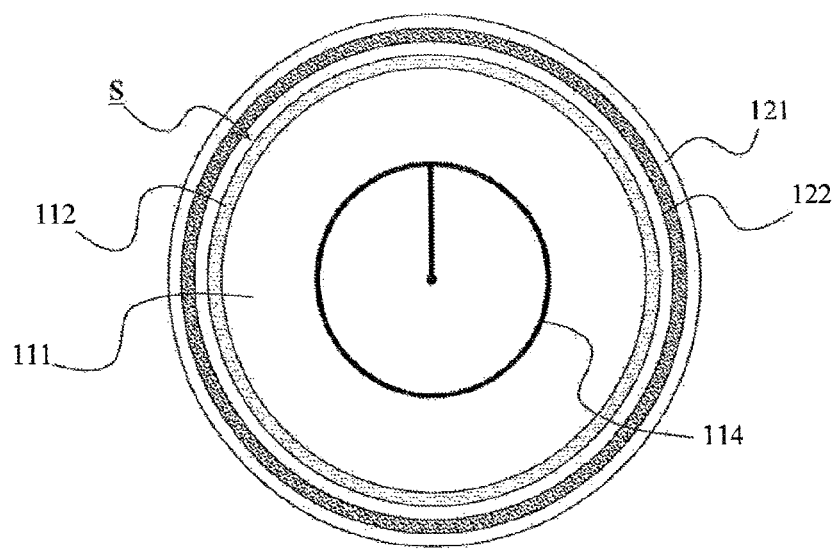
FIG. 2 is a side view of major components of the electrostatic induction power generator according to Embodiment 1 of the present invention.
Figure 3:
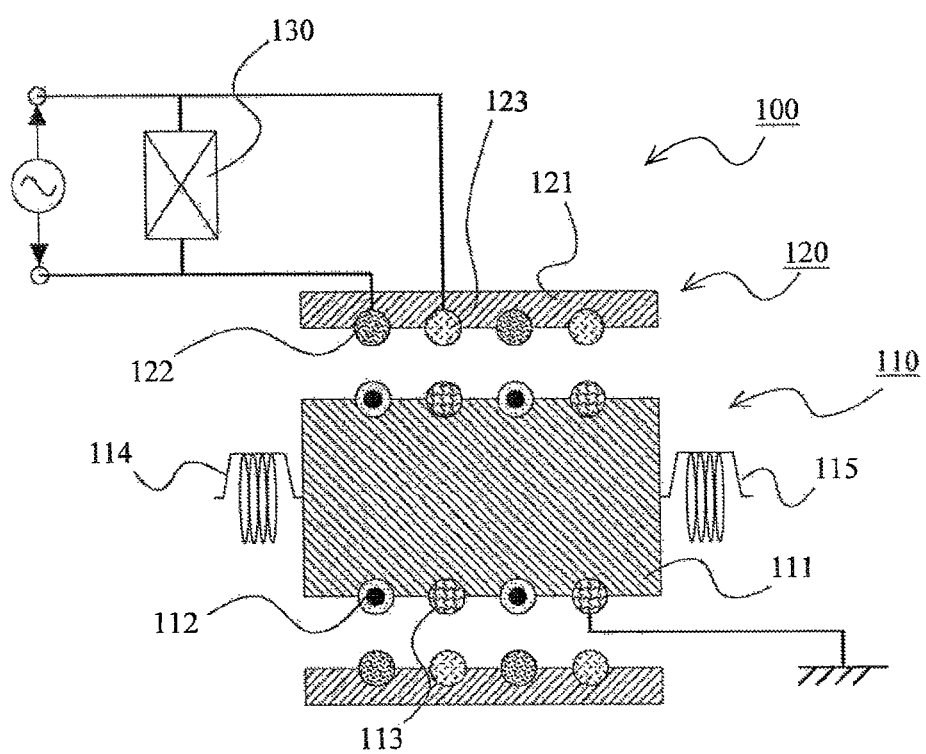
FIG. 3 is a schematic cross-sectional view of major components of the electrostatic induction power generator according to Embodiment 1 of the present invention.

In particular, an overall configuration of the electrostatic induction power generator 100 according to Embodiment 1 of the present invention will be described with reference to FIGS. 1 to 3. FIG. 1 schematically shows the overall configuration. FIG. 2 is a diagram of major components (a first unit 110 and a second unit 120 excluding a housing 101) as seen from a side (from the left in the housing in FIG. 1). FIG. 3 is a schematic cross-sectional view (a cross-sectional view cut along a surface passing through the shaft center) of major components.

The electrostatic induction power generator 100 according to Embodiment 1 of the present invention includes the housing 101 and also includes the first unit 110 and the second unit 120 provided inside the housing 101.

The first unit 110 includes a first base body 111 formed of a circular column shaped member and also includes an electret 112 and a guard electrode 113, each of which is helically wrapped around the outer circumference of the first base body 111. Here, the electret 112 and the guard electrode 113 are wrapped around the outer circumference of the first base body 111 so that the distance between the electret 112 and the guard electrode 113 is constant. Two helical grooves are formed on the outer circumference of the first base body 111. The electret 112 and the guard electrode 113 are wrapped around the outer circumference of the first base body 111 so that the electret 112 and the guard electrode 113 fit into the two grooves respectively. Thus, the electret 112 and the guard electrode 113 are easily positioned. The guard electrode 113 is grounded (see FIG. 3).

The first base body 111 is supported by the housing 101 through a pair of springs 114 and 115. Specifically, one end of the spring 114 is fixed to an inner wall surface of the housing 101 and the other end of the spring 114 is fixed to one end of the first base body 111. One end of the spring 115 is fixed to the other end of the first base body 111 and the other end of the spring 115 is fixed to an inner wall surface of the housing 101. Thereby, when the electrostatic induction power generator 100 vibrates, the first unit 110 reciprocates (vibrates) with respect to the second unit 120 in the left-right direction in FIGS. 1 and 3.

The second unit 120 includes a second base body 121 formed of a cylindrical member and also includes a first electrode 122 and a second electrode 123 helically provided on the inner circumference of the second base body 121. Here, the first electrode 122 and the second electrode 123 are provided on the inner circumference of the second base body 121 so that the distance between the first electrode 122 and the second electrode 123 is constant. Two helical grooves are formed on the inner circumference of the second base body 121. The first electrode 122 and the second electrode 123 provided on the inner circumference of the second base body 121 so that the first electrode 122 and the second electrode 123 fit into the two grooves respectively. Thus, the first electrode 122 and the second electrode 123 are easily positioned. A load 130, to which power obtained by power generation is supplied, is electrically connected to the first electrode 122 and the second electrode 123. The second unit 120 is fixed to the housing 101.

It is configured so that the distance between the electret 112 and the guard electrode 113 is the same as the distance between the first electrode 122 and the second electrode 123. Thereby, when the electret 112 is located at a position facing one of the first electrode 122 and the second electrode 123, the guard electrode 113 is located at a position facing the other one.

In the cylinder of the second base body 121 formed of a cylindrical member, the first base body 111 formed of a circular column shaped member is provided to reciprocate in a state in which the central axes of the first base body 111 and the second base body 121 correspond to each other. Thereby, an annular clearance S is formed so that the distance between the first base body 111 and the second base body 121 is the same over the entire circumferences even when the first base body 111 and the second base body 121 are moved relative to each other. To maintain the state in which the central axes of the first base body 111 and the second base body 121 correspond to each other, bearings or the like may be provided between the first base body 111 and the second base body 121.

Figure 6:
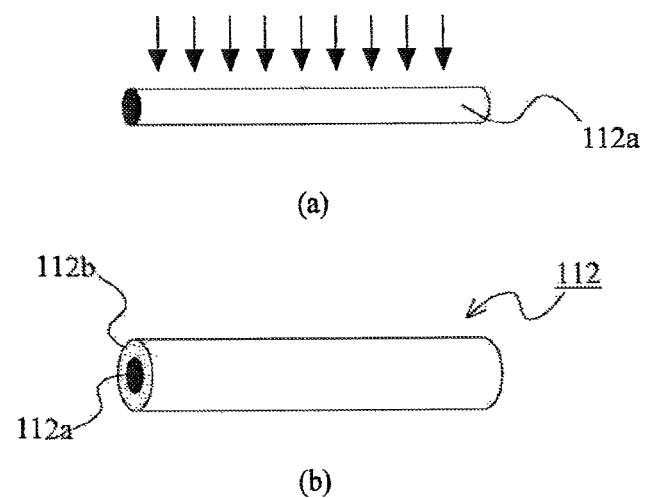
FIG. 6 is a diagram for explaining a method for manufacturing an electret according to embodiments of the present invention.

The electret 112 according to the present embodiment is formed by coating a charged dielectric material on a surface of a linear conducting wire (for example, copper wire) 112a (see FIG. 6). More specifically, the electret 112 is obtained by forming a coated layer 112b by coating SiO2, fluorine system resin, polyimide, or the like on the surface of the conducting wire 112a by dip coating, spray coating, sputtering, electrodeposition, or the like (FIG. 6(a)) and charging the coated layer 112b (FIG. 6(b)). It is found by an experiment that the same amount of charge, which can be stored in an electret obtained by conventional semiconductor microfabrication techniques, can be stored in the electret 112 obtained by performing dip coating five times or more.

The guard electrode 113 is formed of a linear conducting wire (for example, copper wire).

Both of the first electrode 122 and the second electrode 123 are formed of a linear conducting wire (for example, copper wire). An insulating layer such as SiO2, polyimide, and enamel is provided on the surface of the conducting wire of the first electrode 122 and the second electrode 123 of the present embodiment in order to prevent electrical discharge from the electret 112.

<Power Generation Principle of Electrostatic Induction Power Generator>

Figure 4:
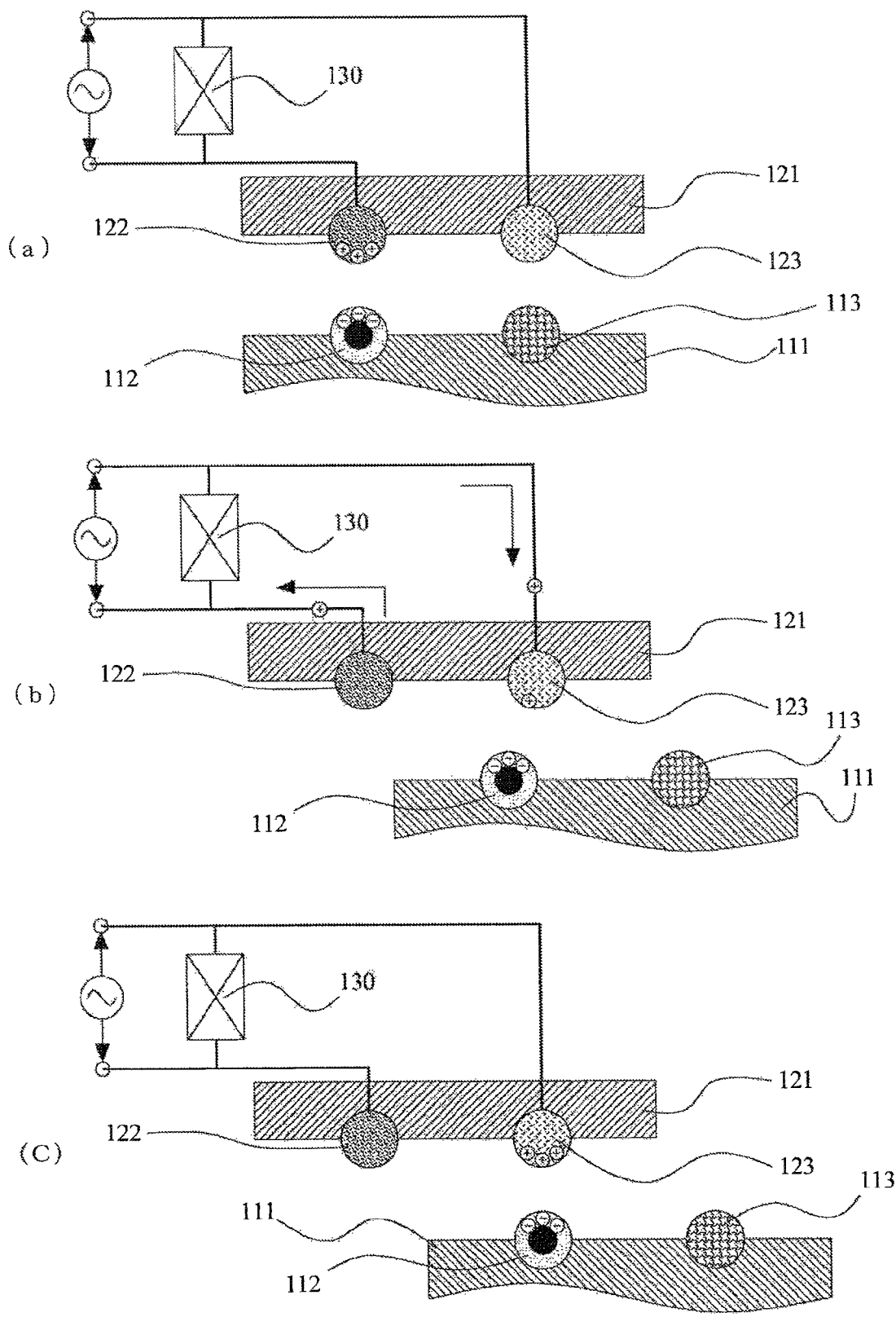
FIG. 4 is a diagram for explaining a power generation principle of the electrostatic induction power generator according to Embodiment 1 of the present invention.

In particular, the power generation principle of the electrostatic induction power generator according to Embodiment 1 of the present invention will be described with reference to FIGS. 4 and 5. The electret of the present embodiment is configured to semipermanently hold a negative electric charge.

When the first unit 110 moves, a relative positional relationship between the first base body 111 and the second base body 121 changes. Accordingly, a positional relationship between the electret 112 and the first electrode 122 changes and a positional relationship between the electret 112 and the second electrode 123 changes. FIG. 4(a) shows a state in which the entire electret 112 and the entire first electrode 122 face each other and the electret 112 and the second electrode 123 do not face each other at all. FIG. 4(b) shows a state in which the electret 112 and the first electrode 122 do not face each other at all and a part of the electret 112 and a part of the second electrode 123 face each other. FIG. 4(c) shows a state in which the entire electret 112 and the entire second electrode 123 face each other and the electret 112 and the first electrode 122 do not face each other at all.

In the state shown in FIG. 4(a), an electrostatic capacitance between the electret 112 and the first electrode 122 is maximum. At this time, there can be an electrostatic capacitance between the electret 112 and the second electrode 123. In the state shown in FIG. 4(c), an electrostatic capacitance between the electret 112 and the second electrode 123 is maximum. At this time, there can be an electrostatic capacitance between the electret 112 and the first electrode 122. In this way, when the first unit 110 (the first base body 111) moves, the electrostatic capacitance between the electret 112 and the first electrode 122 changes and the electrostatic capacitance between the electret 112 and the second electrode 123 changes.

FIG. 4(b) shows a transitional state from the state shown in FIG. 4(a) to the state shown in FIG. 4(c). In this transitional process, the electrostatic capacitance between the electret 112 and the first electrode 122 decreases and the electrostatic capacitance between the electret 112 and the second electrode 123 increases. Therefore, since the first electrode 122 and the second electrode 123 are electrically connected to each other via the load 130, a positive electric charge moves from the first electrode 122 to the second electrode 123. In this way, electric power is generated.

Figure 5:
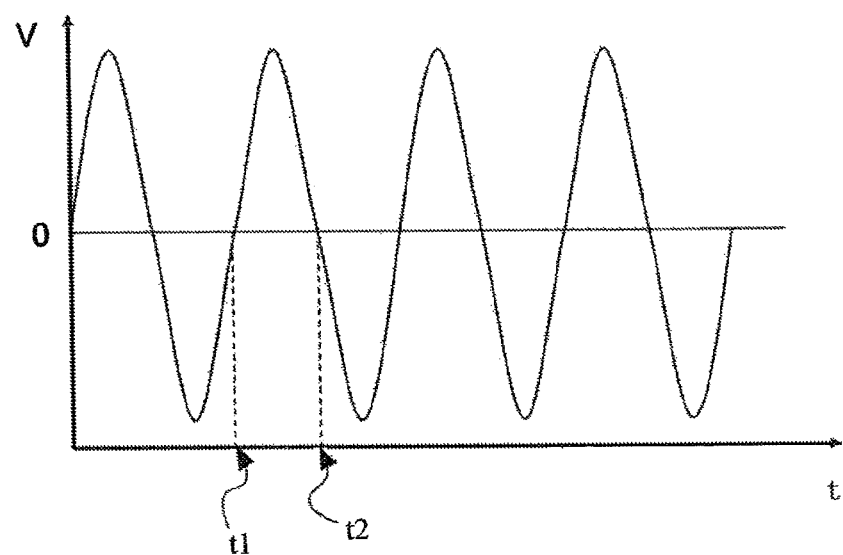
FIG. 5 is a diagram showing an output voltage of the electrostatic induction power generator according to Embodiment 1 of the present invention.

FIG. 5 shows a graph showing variation of output voltage V with respect to elapsed time t in a case in which the state shown in FIG. 4(a) and the state shown in FIG. 4(c) alternately appear with a regular period (the first unit 110 vibrates (reciprocates) with a regular period). In FIG. 5, t1 corresponds to the state shown in FIGS. 4(a) and t2 corresponds to the state shown in FIG. 4(c).

Here, as shown in FIG. 5, it is desired that the output voltage curve is drawn so that the center voltage between the high voltage and the low voltage is 0 (V) in order to obtain a stable output voltage. In the present embodiment, the guard electrode 113 is provided, so that the center voltage between the high voltage and the low voltage of the output voltage can be 0 (V). Specifically, for example, as shown in FIG. 4(a), when the electret 112 and the first electrode 122 face each other and the grounded guard electrode 113 and the second electrode 123 face each other, the potential of the second electrode 123 is 0 (V) due to Kirchhoff's law. In the state shown in FIG. 4(c), the first electrode 122 and the guard electrode 113 (omitted in FIG. 4(c)) face each other, so that the potential of the first electrode 122 is 0 (V). Therefore, it is possible to obtain an output voltage curve as shown in FIG. 5, so that a stable output voltage can be obtained. It is possible to employ a configuration in which the guard electrode is not grounded. When the guard electrode is not grounded, a capacitor is formed between the first electrode and the second electrode, so that the voltage (amount of generated power) can be more stabilized than a case in which the guard electrode is not provided. However, when the guard electrode is grounded, as described above, the center voltage between the high voltage and the low voltage can be 0 (V), so that the voltage (amount of generated power) can be much more stabilized.

<Excellent Points of Electrostatic Induction Power Generator According to the Present Embodiment>

In the present embodiment, the electret 112 is formed by coating a charged dielectric material on a surface of a linear conducting wire, and all of the guard electrode 113, the first electrode 122, and the second electrode 123 are formed of a linear conducting wire (for example, copper wire). Therefore, these components can be manufactured without using semiconductor microfabrication techniques. Thereby, these components can be easily manufactured and the number of components that can be manufactured per unit time can be significantly increased. It is possible to reduce the processing cost by 85% or more compared with a case in which these components are manufactured by using the semiconductor microfabrication techniques. The "linear" in the present embodiment means a long and narrow object including a wiry object having a circular cross section and a belt-shaped object having a rectangular cross section. The shape of the cross section is not limited. This is the same in the embodiments described below.

In the present embodiment, a circular column shaped member is used as the first base body 111 and a cylindrical member is used as the second base body 121, and these members are arranged so that the central axes of these members correspond to each other. Therefore, the annular clearance S is formed between the first base body 111 and the second base body 121 so that the distance between the first base body 111 and the second base body 121 is the same over the entire circumferences. Therefore, it is possible to stably generate electric power. Further, electrostatic attractive forces generated between the electret 112 and the first electrode 122 and between the electret 112 and the second electrode 123 are the same over the entire circumferences. Therefore, it is possible to efficiently reduce effects of the electrostatic attractive forces to the relative reciprocating movement of the first base body 111 and the second base body 121 (theoretically, the electrostatic attractive forces applied to the first base body 111 and the second base body 121 are entirely offset, so that the electrostatic attractive forces do not affect the relative reciprocating movement). Therefore, the responsiveness of the first unit 110 to the vibration of the housing 101 is excellent. In other words, even when the vibration of the housing 101 is small, the first unit 110 vibrates, so that it is possible to generate electric power.

(Embodiment 2 )

Figure 7:
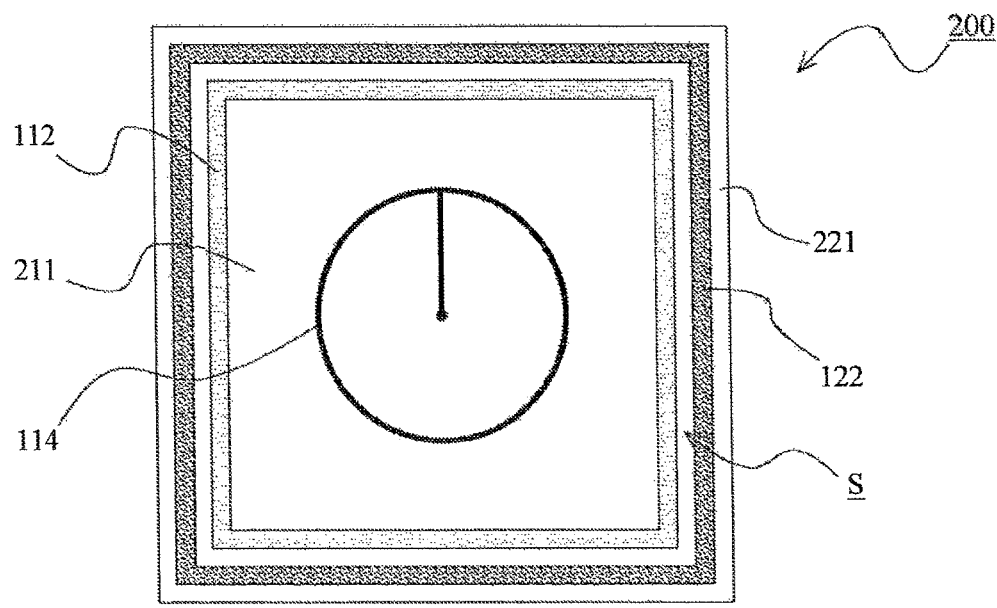
FIG. 7 is a side view of major components of an electrostatic induction power generator according to Embodiment 2 of the present invention.

FIG. 7 shows Embodiment 2 of the present invention. In Embodiment 1, a case is described in which a circular column shaped member is used as the first base body and a cylindrical member is used as the second base body. On the other hand, in the present embodiment, a case will be described in which a rectangular column shaped member is used as the first base body and a tube shaped member having rectangular cross sections of inner and outer circumferences is used as the second base body. The other components and functions are the same as those of Embodiment 1, so that the description of the same components will be omitted.

In an electrostatic induction power generator 200 according to the present embodiment, the first base body 211 is formed of a rectangular column shaped member. A cross-sectional shape of the rectangular column shaped member perpendicular to the reciprocating movement of the first base body 211 and the second base body 221 is a square. The second base body 221 is formed of a tube shaped member having rectangular cross sections of inner and outer circumferences. Cross-sectional shapes of inner and outer circumferences of the tube shaped member perpendicular to the reciprocating movement of the first base body 211 and the second base body 221 is a square.

Also in the present embodiment, an annular clearance S is formed so that the distance between the first base body 111 and the second base body 121 is substantially the same over the entire circumferences even when these base bodies are moved relative to each other. Specifically, even though the clearance increases somewhat near the corners, the clearance is the same in areas other than the corners.

In the present embodiment, the components and the like are the same as those of Embodiment 1, except that the shapes of the first base body 211 and the second base body 221 are different from those of Embodiment 1.

As described above, also in the present embodiment, it is possible to obtain the same effects as those of Embodiment 1 described above.

(Embodiment 3 )

Figure 8:
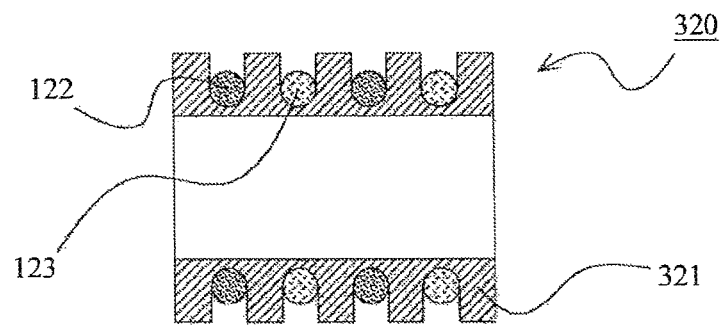
FIG. 8 is a schematic cross-sectional view showing a part of an electrostatic induction power generator according to Embodiment 3 of the present invention.

FIG. 8 shows Embodiment 3 of the present invention. In the present embodiment, a case will be described in which a method of positioning the first electrode and the second electrode with respect to the second base body is different from that of Embodiment 1. The other components and functions are the same as those of Embodiment 1, so that the description of the same components will be omitted.

To improve power generation efficiency, it is necessary to improve positioning accuracy of the electret and the guard electrode with respect to the first base body and positioning accuracy of the first electrode and the second electrode with respect to the second base body. In Embodiment 1, a case is described in which grooves are provided on the base bodies and positioning is performed by fitting the electret and the like into the grooves.

Here, it is easy to attach the electret 112 and the guard electrode 113 to the outer circumference of the first base body 111 formed of a circular column shaped member described in Embodiment 1 or the first base body 211 formed of a rectangular column shaped member described in Embodiment 2. In other words, it is easy to form grooves on the outer circumference of the circular column shaped member or the rectangular column shaped member and it is also easy to wrap the electret 112 and the like around the circumference so that the electret 112 and the like fit into grooves.

On the other hand, it is not easy to attach the first electrode 122 and the second electrode 123 to the second base bodies 121 and 221. Specifically, it is technically difficult to form helical grooves inside a tube and it is also technically difficult to attach the first electrode 122 and the second electrode 123 to the helical grooves formed inside the tube. Therefore, in the present embodiment, an example for facilitating attaching the first electrode 122 and the second electrode 123 will be described.

In a second unit 320 of the present embodiment, as a second base body 321, a cylindrical member, on the outer circumference of which two helical grooves are formed, is used. The first electrode 122 and the second electrode 123 are wrapped around the outer circumference of the second base body 321 so that the first electrode 122 and the second electrode 123 are respectively fitted into the two helical grooves provided on the outer circumference of the second base body 321.

In the present embodiment, the second base body 321 is present between the electret 112 and the first electrode 122 and between the electret 112 and the second electrode, so that the present embodiment has disadvantage in appropriately securing the electrostatic capacitance compared with Embodiment 1. However, according to the present embodiment, the helical grooves are provided on the outer circumference of the second base body 321 formed of a cylindrical member, so that it is easy to form the grooves and also it is easy to wrap the first electrode 122 and the second electrode 123.

(Embodiment 4 )

Figure 9:
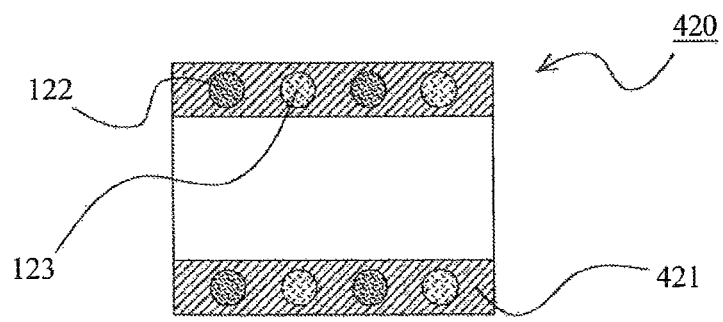
FIG. 9 is a schematic cross-sectional view showing a part of an electrostatic induction power generator according to Embodiment 4 of the present invention.

FIG. 9 shows Embodiment 4 of the present invention. Also in the present embodiment, a case will be described in which the positioning of the first electrode and the second electrode with respect to the second base body is facilitated in the same manner as in Embodiment 3. The other components and functions are the same as those of Embodiment 1, so that the description of the same components will be omitted.

In a second unit 420 of the present embodiment, the first electrode 122 and the second electrode 123 are provided integrally with a second base body 421 by insert molding. Specifically, in the present embodiment, the insert molding is performed in a state in which the first electrode 122 and the second electrode 123 are attached to a predetermined position inside a mold as insert components, so that the second unit 420 is manufactured in which the first electrode 122 and the second electrode 123 are provided integrally with the second base body 421. Thereby, the positioning of the first electrode 122 and the second electrode 123 with respect to the second base body 421 can be performed easily and accurately. Also in the present embodiment, the second base body 421 is present between the electret 112 and the first electrode 122 and between the electret 112 and the second electrode, so that the present embodiment has disadvantage in appropriately securing the electrostatic capacitance compared with Embodiment 1.

(Embodiment 5)

Figure 10:
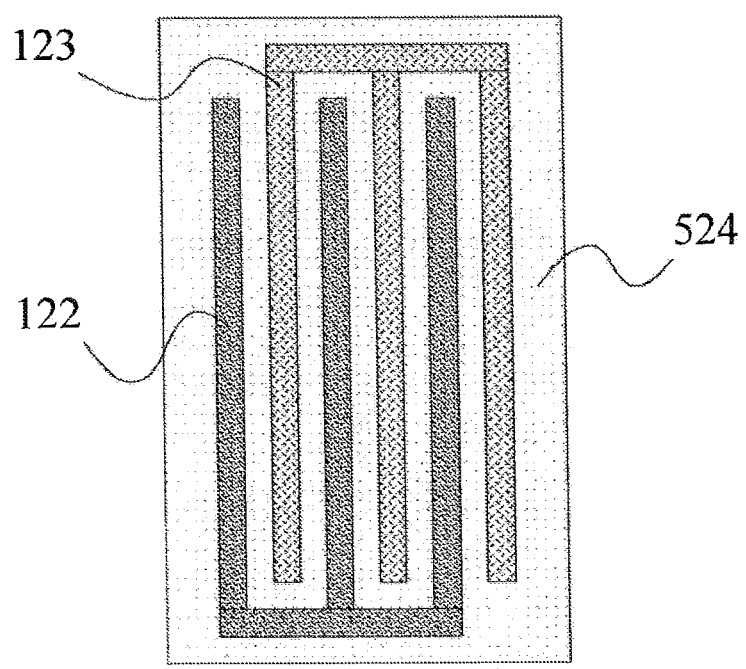
FIG. 10 is a diagram for explaining a method for mounting a first electrode and a second electrode according to Embodiment 5 of the present invention.
Figure 11:
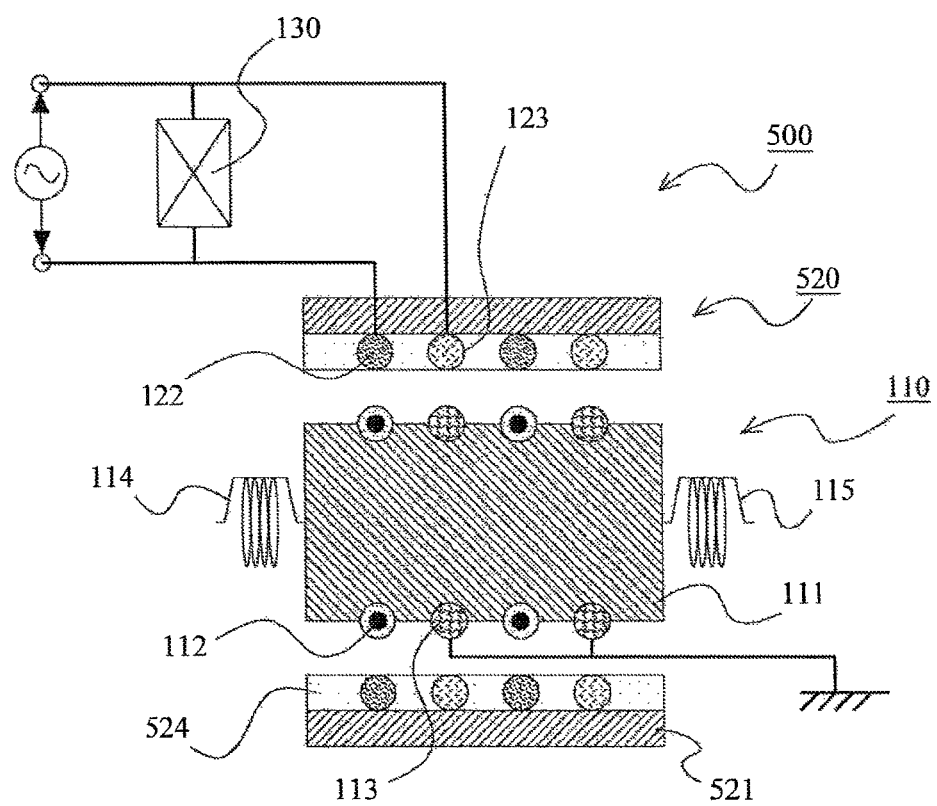
FIG. 11 is a schematic cross-sectional view of major components of an electrostatic induction power generator according to Embodiment 5 of the present invention.

FIGS. 10 and 11 show Embodiment 5 of the present invention. Also in the present embodiment, a case will be described in which the positioning of the first electrode and the second electrode with respect to the second base body is facilitated in the same manner as in Embodiment 3 and Embodiment 4. The other components and functions are the same as those of Embodiment 1, so that the description of the same components will be omitted.

The present embodiment employs a configuration in which an insulating sheet 524, on which the first electrodes 122 and the second electrodes 123 are provided, is attached to the inner circumferential surface of the second base body 521 formed of a cylindrical member. Specifically, first, as shown in FIG. 10, a plurality of first electrodes 122 and a plurality of second electrodes 123 are attached onto the insulating sheet 524 in a comb-shaped pattern. Then the insulating sheet 524, to which the first electrodes 122 and the second electrodes 123 are attached, is attached to the inner circumferential surface of the second base body 521. Thereby, the positioning of the first electrodes 122 and the second electrodes 123 with respect to the second base body 521 can be performed easily.

In the present embodiment, different from Embodiments 1 to 4 described above, the first electrode 122 and the second electrode 123 are not provided helically, but arranged as a plurality of circles at constant intervals in the axis direction. Therefore, in the first unit 110, the electret 112 and the guard electrode 113 provided on the first base body 111 are not provided helically, but arranged as a plurality of circles at constant intervals in the axis direction so that the electrets 112 and the guard electrodes 113 correspond to the first electrode 122 and the second electrode 123. Accordingly, a plurality of guard electrodes 113 are provided, so that each of the guard electrodes 113 should be grounded. However, as described above, it is possible to employ a configuration in which the guard electrodes 113 are not grounded.

(Embodiment 6)

Figure 12:
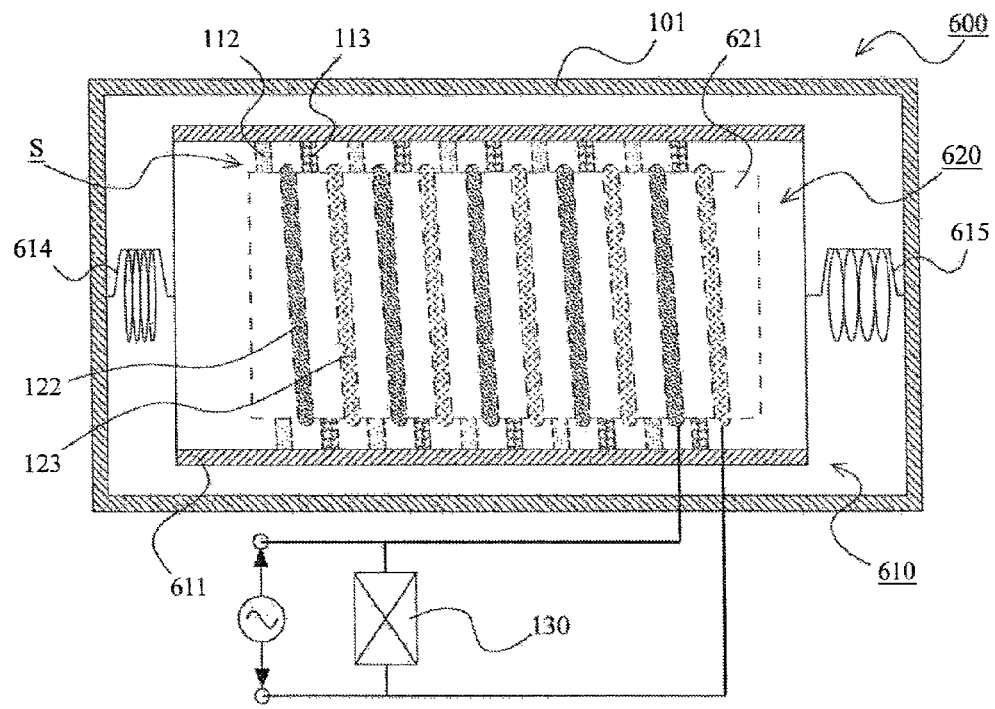
FIG. 12 is a schematic configuration diagram showing an overall configuration of an electrostatic induction power generator according to Embodiment 6 of the present invention.

FIG. 12 shows Embodiment 6 of the present invention. In the above embodiments, configurations are shown, in which the first base body is formed of a circular column shaped member or a rectangular column shaped member, the second base body is formed of a cylindrical member, and the first base body is disposed inside the tube of the second base body. On the other hand, in the present embodiment, a configuration is shown, in which the first base body is formed of a cylindrical member, the second base body is formed of a circular column shaped member, and the second base body is disposed inside a tube of the first base body. The other basic components and functions are the same, so that a detailed description will be appropriately omitted.

An electrostatic induction power generator 600 according to Embodiment 6 of the present invention includes a housing 101 and also includes a first unit 610 and a second unit 620 provided inside the housing 101.

The first unit 610 includes a first base body 611 formed of a cylindrical member and also includes an electret 112 and a guard electrode 113, each of which is helically provided on the inner circumference of the first base body 611. The first base body 611 is supported by the housing 101 through a pair of springs 614 and 615. Specifically, one end of the spring 614 is fixed to an inner wall surface of the housing 101 and the other end of the spring 614 is fixed to one end of the first base body 611. One end of the spring 615 is fixed to the other end of the first base body 611 and the other end of the spring 615 is fixed to an inner wall surface of the housing 101. Thereby, when the electrostatic induction power generator 600 vibrates, the first unit 610 reciprocates (vibrates) with respect to the second unit 620 in the left-right direction in FIG. 12.

The second unit 620 includes a second base body 621 formed of a circular column shaped member and also includes the first electrode 122 and the second electrode 123 helically wrapped around the outer circumference of the second base body 621. The second unit 620 is fixed to the housing 101.

In the present embodiment, the first base body 611 formed of a cylindrical member is provided to reciprocate over the outer circumference of the second base body 621 formed of a circular column shaped member in a state in which the central axes of the first base body 611 and the second base body 621 correspond to each other. Thereby, an annular clearance S is formed so that the distance between the first base body 611 and the second base body 621 is the same over the entire circumferences even when the first base body 611 and the second base body 621 are moved relative to each other.

Needless to say, in the present embodiment, it is possible to obtain the same effects as those of Embodiment 1 described above.

(Others)

Although, in Embodiment 1 described above, a case is described in which the first base body 111 is formed of a circular column shaped member, a cylindrical member can be used as the first base body 111. In the same manner, a cylindrical member can be used as the second base body 621 of Embodiment 6. When a cylindrical member is used as the first base body 111 of Embodiment 1 and when a cylindrical member is used as the second base body 621 of Embodiment 6, beams or the like maybe provided at both ends of the cylindrical member and the springs 114, 115, 614, and 615 may be fixed to the beams.

As the first base body and the second base body, a member having an elliptical cross-sectional shape (a shape of a cross-section perpendicular to the reciprocating direction of the first base body and the second base body) may be used instead of a circular column shaped member or a cylindrical member. Further, although, in Embodiment 2, a case is described in which a rectangular column shaped member having a square cross-sectional shape is used as the first base body and a tube shaped member whose inner and outer circumferences have a square cross-sectional shape is used as the second base body, members having a polygonal cross-sectional shape other than a rectangular shape (a square shape) can be used.

In this way, various shapes can be used as the shapes of the first base body and the second base body. The point is that the shape of the annular clearance S formed between the first base body and the second base body is important. To reduce the effects of the electrostatic attractive forces and obtain stable power generation, it is desired that the annular clearance S has the same clearance over the entire circumferences. Therefore, from this viewpoint, it can be said that the configurations shown in Embodiment 1 and Embodiment 6 are the best. However, when the clearance of the annular clearance S is substantially the same over the entire circumferences, it is possible to obtain a somewhat stable amount of power generation. Regarding the first base body and the second base body, when the centroids of the shape of the cross-section of the outer circumference of the base body provided inside and the shape of the cross-section of the inner circumference of the base body provided outside correspond to each other and the shapes have symmetry with respect to the centroids, it is possible to eliminate the effects of the electrostatic attractive forces. Even if the symmetry is not perfect, it is possible to reduce the effects of the electrostatic attractive forces. Because of the above, the shapes of the first base body and the second base body are not particularly limited.

In the above embodiments, cases are described, in which the first base body is configured to be movable with respect to the housing 101 and the second base body is fixed to the housing, so that the first base body and the second base body reciprocate relative to each other. This is because that wiring to extract electric power is electrically connected to the second base body, so that the second base body is desired to be fixed. However, the second base body does not necessarily need to be fixed. Therefore, the first base body may be fixed to the housing 101 and the second base body may move with respect to the housing 101 so that the first base body and the second base body reciprocate relative to each other. Or, both of the first base body and the second base body may be configured to be movable with respect to the housing 101 so that the first base body and the second base body reciprocate relative to each other.

(Reference Example)

Figure 13:
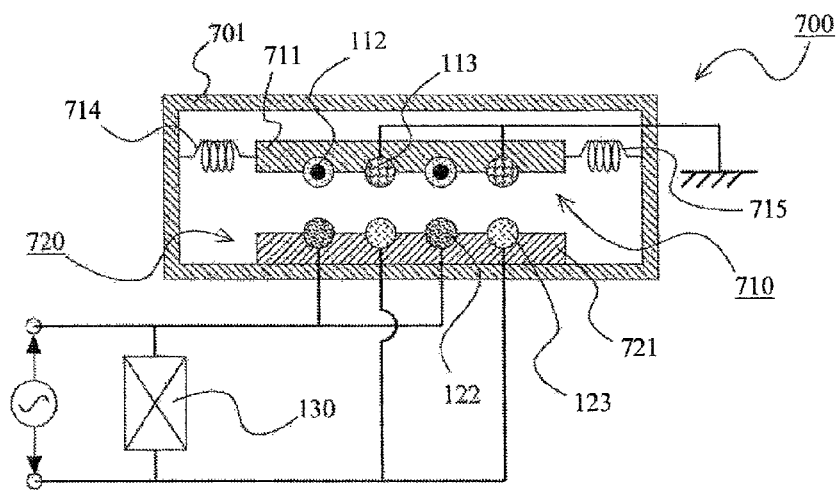
FIG. 13 is a schematic cross-sectional view of major components of an electrostatic induction power generator according to a reference example of the present invention.

In the above embodiments, cases are described, in which the annular clearance S is formed between the first base body and the second base body to reduce or eliminate the effects of the electrostatic attractive forces. However, from the viewpoint that the processing cost is reduced by manufacturing the electret and the like without using semiconductor microfabrication techniques, it is possible to reduce the processing cost even when the electret is provided on one of a pair of plate substrates and the first electrode and the second electrode are provided on the other substrate as in a normal electrostatic induction power generator. Such a case will be described with reference to FIG. 13.

An electrostatic induction power generator 700 according to the reference example includes a housing 701 and also includes a first unit 710 and a second unit 720 provided inside the housing 701.

The first unit 710 includes a tabular first base body (substrate) 711 and also includes a plurality of electrets 112 and guard electrodes 113 provided on the first base body 711. The first base body 711 is supported by the housing 101 through a pair of springs 714 and 715.

The second unit 720 includes a tabular second base body (substrate) 721 and also includes a plurality of first electrodes 122 and second electrodes 123 provided on the second base body 721.

The electret 112, the guard electrode 113, the first electrode 122, and the second electrode 123 are the same as those described in the embodiments described above.

Although the electrostatic induction power generator 700 configured as described above has the same structure as that of a normal electrostatic induction power generator, the electret 112 and the like can be manufactured without using semiconductor microfabrication techniques, so that it is possible to reduce the processing cost.

While the present invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

100, 200, 600 Electrostatic induction power generator
101 Housing
110, 610 First unit
111, 211, 611 First base body
112 Electret
112a Conducting wire
112b Coated layer
113 Guard electrode
114, 115, 614, 615 Spring
120, 320, 420, 620 Second unit
121, 221, 321, 421, 521, 621 Second base body
122, 522 First electrode
123, 523 Second electrode
130 Load
524 Insulating sheet
S Annular clearance

The invention claimed is:

1. An electrostatic induction power generator comprising:
a first base body and
a second base body,
wherein an annular clearance is formed between the first base body and the second base body,
wherein at least one of the first base body and the second base body comprises a tube-shaped member that is disposed outside of the other of the two base bodies,
wherein the first base body and the second base body are configured to be able to reciprocate relative to each other in an axial direction of the tube-shaped member due to vibration of the electrostatic induction power generator,
wherein the first base body comprises a double-helical linear conducting wire arrangement,
wherein a first wire of the double-helical linear conducting wire arrangement is an electret and a second wire of the double-helical linear conducting wire arrangement is a guard electrode formed of a linear conducting wire,
wherein the second base body comprises a double-helical linear conducting wire arrangement, wherein a first wire of the double-helical linear conducting wire arrangement is a first electrode and a second wire of the double-helical linear conducting wire arrangement is a second electrode,
wherein electric power is output when a positional relationship between the electret and the first electrode changes and a positional relationship between the electret and the second electrode changes following a change of relative positions of the first base body and the second base body and thereby an electrostatic capacitance between the electret and the first electrode changes and an electrostatic capacitance between the electret and the second electrode changes,
wherein the electret is formed by coating a charged dielectric material on a surface of a linear conducting wire, and wherein both of the first electrode and the second electrode are formed of a linear conducting wire.

2. The electrostatic induction power generator according to claim 1, wherein the first base body and the second base body are configured to be able to reciprocate relative to each other while the annular clearance formed between the first base body and the second base body maintains a constant clearance over the entire circumferences and the annular clearance is formed so that the clearance is substantially the same over the entire circumferences.

3. The electrostatic induction power generator according to claim 2, wherein one of the first base body and the second base body is formed of a cylindrical member and the other one is formed of a circular column shaped member or a cylindrical member provided so that a central axis thereof corresponds to a central axis of the cylindrical member inside a cylinder of the cylindrical member.

4. The electrostatic induction power generator according to claim 3, wherein an insulating layer is provided on surfaces of the conducting wires of the first electrode and the second electrode.

5. The electrostatic induction power generator according to claim 2, wherein an insulating layer is provided on surfaces of the conducting wires of the first electrode and the second electrode.

6. The electrostatic induction power generator according to claim 1, wherein an insulating layer is provided on surfaces of the conducting wires of the first electrode and the second electrode.

7. The electrostatic induction power generator according to claim 1, wherein an insulating layer is provided on surfaces of the conducting wires of the first electrode and the second electrode.

8. The electrostatic induction power generator according to claim 1, wherein grooves for receiving the linear conducting wire are formed on an outer circumference of the first base body.

9. The electrostatic induction power generator according to claim 1, wherein the first base body and the second base body are configured to be movable with respect to a housing, wherein the first base body and the second base body reciprocate relative to each other.

10. The electrostatic induction power generator according to claim 1, wherein the first base body comprises a rectangular column-shaped member and the second base body comprises a tube-shaped member, the tube-shaped member having rectangular cross-sections of inner and outer circumferences which are disposed outside of the first base body.

11. The electrostatic induction power generator according to claim 1, wherein the second base body comprises a cylindrical member which is disposed outside of the first base body, and wherein two helical grooves are formed on an outer circumference of the second base body, and the first electrode and the second electrode are fitted into the two helical grooves.

12. The electrostatic induction power generator according to claim 1, wherein the first electrode and the second electrode are provided integrally with the second base body by insert molding.

13. The electrostatic induction power generator according to claim 1, wherein the second base body comprises a cylindrical member which is disposed outside the first base body, wherein an insulating sheet, on which the first electrodes and the second electrodes are provided, is attached to an inner circumferential surface of the second base body.

* * * * *